United States Patent [19]

Pipich et al.

[11] Patent Number: 4,579,349
[45] Date of Patent: Apr. 1, 1986

[54] SINGLE RING GLAND SEAL FOR A DYNAMOELECTRIC MACHINE ROTATING SHAFT

[75] Inventors: Charles W. Pipich, Monroeville Boro; Robert R. Young, Murrysville, both of Pa.

[73] Assignee: Westinghouse Electric Corp., Pittsburgh, Pa.

[21] Appl. No.: 686,769

[22] Filed: Dec. 27, 1984

[51] Int. Cl.⁴ .................... F16J 15/40; F16J 15/48
[52] U.S. Cl. .................................... 277/3; 277/16; 277/27; 277/75; 277/174
[58] Field of Search .............. 277/3, 27, 15, 16, 70, 277/71, 72 R, 72 FM, 75, 76, 79, 59, 174

[56] References Cited

U.S. PATENT DOCUMENTS 1,453,083  4/1923  Schuler .
3,915,459 10/1975  Kunderman ................... 277/27
4,114,058  9/1978  Albaric ...................... 277/3 X
4,305,592 12/1981  Peterson .................... 277/75 X
4,486,024 12/1984  Cooper ........................ 277/3

FOREIGN PATENT DOCUMENTS 865605  4/1961  United Kingdom ............... 277/3

Primary Examiner—Robert S. Ward
Attorney, Agent, or Firm—R. S. Lombard

[57] ABSTRACT

A gland seal for a dynamoelectric machine which utilizes a passage through a ring member for conducting a relatively low pressure gas between a first axial face and a second axial face of the ring member. The seal also includes a relief portion in the first axial face whereby the ring member is forced against the high pressure side of the gland seal thereby diminishing the flow of oil to the high pressure side which is desirable in a hydrogen-cooled generator system.

24 Claims, 5 Drawing Figures

SINGLE RING GLAND SEAL FOR A DYNAMOELECTRIC MACHINE ROTATING SHAFT

BACKGROUND OF THE INVENTION

The present invention relates generally to gas seals which surround rotating shafts and, more particularly, to gland seals which utilize a thin film of oil which is maintained between the rotating shaft and a single ring member.

During the past 60 years, the development of hydrogen-cooled dynamoelectric machines has advanced significantly. Since the issuance of U.S. Pat. No. 1,453,083 to Schuller on Apr. 24, 1923, progress in hydrogen cooling of electrical generators has occurred steadily, along with suitable sealing devices which prevent the escape of hydrogen gas along the rotating shafts of the machine at the locations where the shaft extends axially from the gas-tight stator housing. The sealing of the interface between stationary and rotating components the dynamoelectric machine is generally accomplished by the use of a gland seal.

A hydrogen-cooled dynamoelectric machine, such as a generator, requires shaft gland seals at each end of the generator's rotor in order that hydrogen gas is prevented from escaping from the generator housing and also in order that air is not permitted to enter the generator housing. Gland seal assemblies generally comprise a bracket member and one or more sealing rings which are fitted close to the shaft's circumference and are free to move with the shaft in a radial direction. Generally, these rings are also permitted a slight axial movement along the shaft's surface, but are retained so that they cannot rotate around the shaft. Sealing oil acts as a barrier fluid and is provided at the interface between the shaft and rings in order to prevent the disadvantageous passage of gas through this gap. In typical gland seal designs, oil is pumped in a radially inward direction through the ring assembly and toward the rotor surface, where contacting the rotating surface of the rotor, the oil travels in opposing axial directions and produces a thin oil film between the shaft and the gland seal ring.

The oil must be provided at a pressure which exceeds both the hydrogen pressure within the generator and the atmospheric pressure of the air at the axially outboard region of the gland seal assembly. The oil leaving both the air and hydrogen sides of the gland seal assembly is then typically collected and returned to a gland seal oil reservoir. It is generally necessary to remove gas and moisture from the gland seal oil supply by a vacuum treating process in order to prevent the reduction in hydrogen purity within the generator housing.

Gland seal oil systems have been described at length in the technical literature. For example, the early development of gland seals is discussed in "hydrogen cooled turbine generators" by M. D. Ross and C. C. Sterrett, Vol. 59, AIEE Transactions, January, 1940, pps. 11–17. Another discussion of the sealing of hydrogen cooled generators can be found in "The Hydrogen Cooled Turbine Generator" by D. S. Snell, Vol. 59, AIEE Transactions, January, 1940, pps. 35–50. The dynamics of oil seal systems have been analyzed in "liquid film seal for hydrogen cooled machines" by C. W. Rice, General Electric Review, Vol. 30, No. 11, November, 1927, pps. 516–530. An oil purification system used in conjunction with gland seals is described in "continuous scavenging system for hydrogen cooled generators" by D. S. Snell and L. P. Grobel, AIEE Transactions, Vol. 69, 1950, pps. 1625–1636.

When hydrogen pressures are used, the loss of hydrogen can be excessive and expensive. This hydrogen loss is a function of the quantity of oil flowing toward the hydrogen side of the gland seal. In order to minimize this hydrogen loss on larger generators, double oil flow systems were developed in the 1950s. Double flow oil systems use two separate oil flows. One oil flow is directed toward the air side of the seal and the other is directed toward the hydrogen, or generator, side with a small buffer zone in between. These two oil systems are designed so that their pressures can be generally equalized, thus minimizing both the introduction of entrained air into the hydrogen and the loss of hydrogen by entrainment in the oil. A detailed description of single flow and double flow gland seal systems is contained in "Gland Seal Systems for Modern Hydrogen Cooled Turbine Generators", by R. A. Baudry and L. T. Curtis, which was presented at the AIEE Winter General Meeting, New York, Jan. 21–25, 1957, pps. 1–10.

Significant problems are experienced in conjunction with presently known gland seal designs. Excessive oil can be introduced into the generator either by intermittent oil spills or on a regular continuing basis. The normally expected oil flow toward the hydrogen side of the seal ring at any given differential seal oil pressure have been found to be of prime importance in the generator's oil usage. This oil flow creates vapor in proportion to its quantity. It must be drained in order to avoid spills within the generator housing. Therefore, it is significantly advantageous to reduce this oil flow.

In the present designs, it has sometimes been found that more than half the flow of oil to the hydrogen side passes in a radially inward direction between an axial face of the gland seal ring and the adjacent axial surface of an annular groove typically included within the gland seal bracket for containing the ring. The clearance between the gland seal ring and the bracket is generally held to be a nominal 0.007 inches to permit the radial movement of the gland seal ring to prevent rubbing of the ring between the bracket itself and the shaft and, thus, avoiding unstable shaft vibrations. This escaping oil, which does not beneficially aid the primary function of the gland seal system, typically travels a radial distance of approximately 0.37 inches from a hydrogen side oil feed groove to the hydrogen gas atmosphere within the generator frame. The significance of this oil loss can be realized by comparing this oil path to the axial clearance between the ring and the shaft which is typically only about 0.0025 to 0.0035 inches over a length which is approximately 0.625 inches long in the axial direction. Since any oil flow through this type of clearance is proportional to the cube of the clearance and inversely proportional to the length of passage and the oil of viscosity, it can be calculated that this non-functional radial flow exceeds the functional axial flow and can constitute over half the total flow into the generator under these conditions.

SUMMARY OF THE INVENTION

There is provided a single ring gland seal for a dynamoelectric machine rotating shaft member. The dynamoelectric machine as is well known includes a stator. The seal comprises a ring member having an inner cylindrical surface. The inner surface of the ring member encompasses the shaft member by a predetermined clearance.

The ring member has a first axial face with a first portion thereof nearest the shaft member contacting a low pressure gaseous zone such as atmospheric air. The ring member has a second axial face with a second portion thereof nearest the shaft member contacting a high pressure gaseous zone such as hydrogen gas. The ring member has an outer radial face between the first and second axial faces.

A bracket which typically is part of the stator is provided having an annular groove therein being shaped to receive the ring member. The ring member is axially moveable along the shaft member within the annular groove. Channel means are provided through the ring member for conducting a barrier fluid typically oil between the shaft and the annular groove. Barrier fluid input means is provided for supplying barrier fluid to the channel means at a predetermined pressure which is greater than the pressure of the high pressure gaseous zone.

The ring member has passage means therethrough for conducting the relatively low pressure gas between the first axial face and the second axial face. The first axial face has a relief portion whereby the pressurized barrier fluid exerts a force against the relief portion of the first axial face which is greater than the force exerted against the second axial face of the ring member whereby the second axial face is maintained against the annular groove thereby diminishing the flow of the barrier fluid into the high pressure gaseous zone.

There is also disclosed an embodiment for a double-flow system where the barrier fluid comprises a first fluid principally contacting the low pressure gaseous zone and a second fluid principally contacting the high pressure gaseous zone. The first fluid is typically oil containing entrained air and the second fluid is typically oil containing entrained hydrogen. In the double-flow type single gland seal, the channel means comprises a first channel means through the ring member between the shaft and the outer radial face for carrying the first fluid and a second channel means through the ring member between the shaft and the second axial face for carrying the second fluid. The second channel at the second axial face is in close proximity to the high pressure gaseous portion of the second axial face. When the present invention is used with a double-flow type gland seal, it has been found advantageous to include a third channel means between the outer radial face and the second axial face for carrying the first fluid. The third channel means at the second axial face is positioned intermediate the second channel means and a passage means whereby the second fluid is prevented from leaking to the passage means.

In another embodiment of the present invention, it has been found that the single ring gland seal may further comprise face seal means positioned proximate one end of the relief portion of the first face proximate the low pressure gaseous zone. The face seal means contacts the annular groove whereby leakage of the barrier fluid into the low pressure gaseous zone is reduced. The face seal means may include a segmented face seal ring.

BRIEF DESCRIPTION OF THE DRAWINGS

For a better understanding of the invention, reference may be had to the preferred embodiments as disclosed in the accompanying drawings, in which.

DESCRIPTION OF THE PREFERRED EMBODIMENTS

Figure 1:
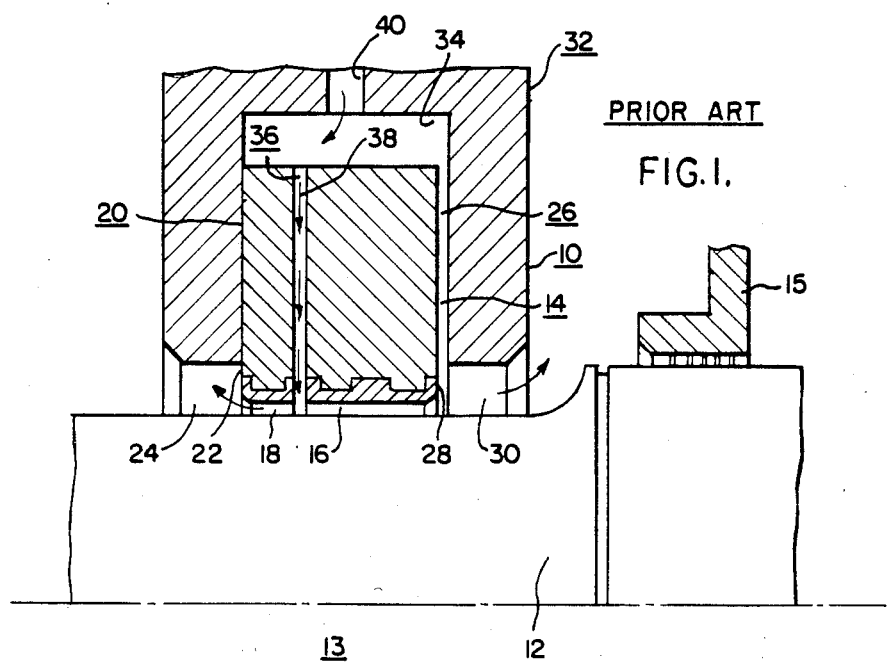
FIG. 1 is a cross-section of the single ring gland seal single-flow type of the prior art.

Referring to FIG. 1, there is provided a single ring gland seal 10 for a rotating shaft member 12 of a dynamoelectric machine 13. Typically the dynamoelectric machine includes a stator 15. The single ring gland seal 10 comprises a ring member 14 having a first inner cylindrical surface 16. A first inner surface 16 of the ring member 14 emcompasses the rotating shaft member 12 by a predetermined clearance 18. The ring member 14 has a first axial face 20 with a first portion 22 thereof nearest the shaft member 12 contacting a low pressure gaseous zone 24. The ring member 14 has a second axial face 26 with a second portion 28 thereof nearest the shaft member 12 contacting a high pressure gaseous zone 30.

Bracket means 32 has an annular groove 34 therein being shaped to receive the ring member 14. The ring member 14 is axially moveable along the shaft member 12 within the annular groove 34. Channel means 36 is provided through the ring member 14 for conducting a barrier fluid 38 further indicated by the solid arrows between the annular groove 34 and the shaft member 12. Barrier fluid input means 40 supplies barrier fluid 38 to the channel 36 at a predetermined pressure which is greater than the pressure of a high pressure gaseous zone 30. The barrier fluid input means typically includes pumps, valves and lines as is known in the art.

The gland seal 10 described to this point is the prior art single-flow type seal shown in FIG. 1 and the general operation of such a gland seal 10 has been described previously in the background of the invention. As can be seen in FIG. 1, the first axial face 20 of the ring member 14 is in contact with the annular groove 34 but a clearance is maintained between the second axial face 26 and the annular groove 34. Typically, this clearance is about 0.007 inch. The ring member 14 in the prior art as shown in FIG. 1 is forced against the the annular groove as a result of the gas and oil pressures exerted within the seal. The pressure of the barrier fluid is normally maintained at a pressure several psi higher than the gas pressure in the system in order to minimize the gas leakage. For example, in a hydrogen-cooled generator, the low pressure gas zone 24 of the seal 10 comprises air at atmospheric pressure while the high pressure gas zone comprises hydrogen at 87 pounds per square inch, for example. The barrier fluid is typically oil at a pressure of a few pounds per square inch higher than the hydrogen pressure. The clearance created by the prior art seal on the high pressure gas side, i.e., hydrogen side, of the annular groove 34 allows oil to undesirably leak past the second axial face 26 of the seal 10 which may result in oil contaminating the internal part of the generator by reducing the hydrogen purity within the generator housing 29.

Figure 2:
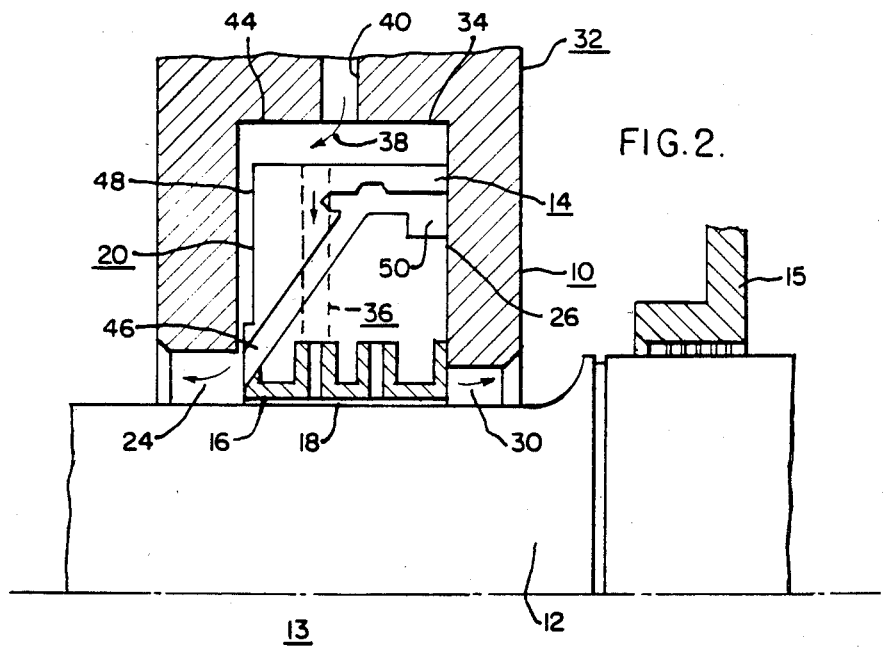
FIG. 2 is a cross-section of a single ring gland seal single-flow type of the present invention.

Referring to FIG. 2, where corresponding elements of FIG. 1 are identified by like numerals, the gland seal 10 of the present invention further comprises a ring member 14 having a passage means 46 therethrough for conducting a relatively low pressure gas from the low pressure gaseous zone 24 between the first axial face 20 and the second axial face 26 of the ring member 14 thereby lowering the pressure on the second axial face 26. The first axial face 20 is also provided with a relief portion 48, whereby the pressurized barrier fluid 38 exerts a force against the relief portion 48 of the first axial face which is greater than the force exerted against the second axial face 26 of the ring member 14 whereby the second axial face 26 is maintained against the annular groove 34 thereby diminishing the flow of the barrier fluid 38 into the high pressure gaseous zone 30. This invention reverses the hydraulic forces on the ring 14 from the prior art configuration. The passage means 46 is preferably provided with an annulus 50 located proximate the second axial face 26 of the ring member. Selection of the diameters of the annulus 50 on the hydrogen side of the seal and the diameters of the relief portion 48 of the first axial face 20 on the air side of the seal provides a wide range of hydraulic forces holding the ring member 14 against the the annular groove 34 (i.e., from zero to several thousand pounds). For example, in a typical system, the shaft 12 is typically 21 inches in diameter. The diametrical clearance between the shaft 12 and ring member 14 is 0.010 inch. The inner and outer diameters of the relief portion, for example, as taken radially from the shaft surface typically are 23.3 inches in diameter and 25.5 inches in diameter and the inner and outer diameters for the annulus 50 are 24 inches in diameter and 24.5 inches in diameter. A force of 600 lbs. toward the hydrogen side will be exerted. With a reduction in the area of the annulus 50 and an increase in the diameter of the relief portion 48, there will be a reduction in the force exerted on the ring member 14 towards the hydrogen side. However with zero annulus area and no relief diameter, the forces on ring 14 are reversed with a magnitude of 7000 lbs.

Figure 3:
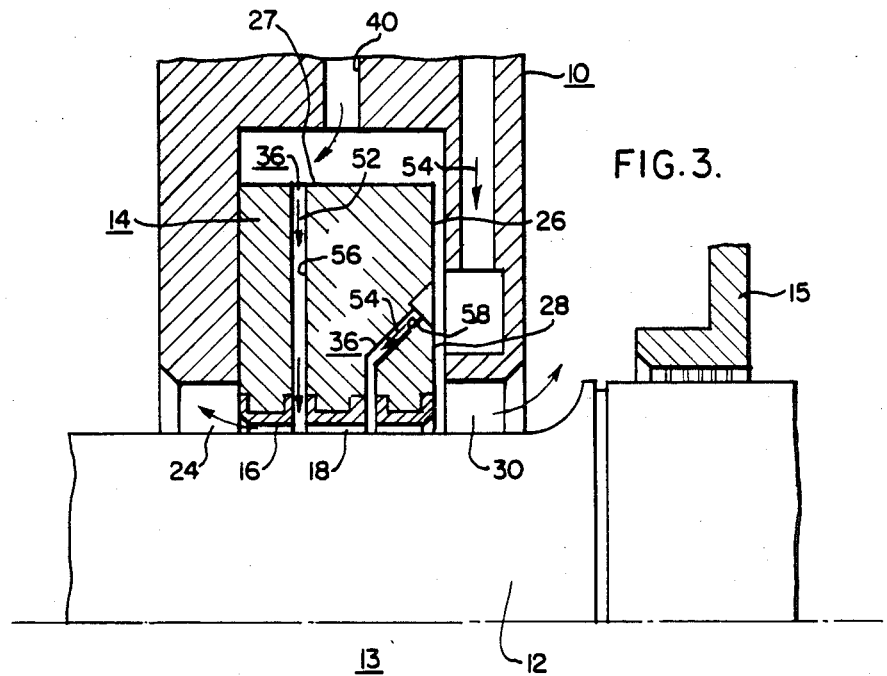
FIG. 3 is a cross-section of a single ring gland seal of the double-flow type of the prior art.

With reference to FIG. 3, where like numerals represent like components of the previous figures, "a double-flow" single gland seal 10 is shown of the prior art. In a double-flow type seal, the barrier fluid 38 within the seal 10 comprises a first fluid 52 principally contacting the low pressure gaseous zone 24 and a second fluid 54 principally contacting the high pressure gaseous zone 30 in a hydrogen-cooled generator, the first fluid 52 is typically oil containing entrained air and the second fluid 54 is typically oil containing entrained hydrogen gas. The seal 10 further comprises channel means 36 comprising a first channel means 56 through said ring member 14 between the first inner cylindrical surface 16 and the outer radial face 27 for carrying the first fluid 52. The channel means 36 also comprises a second channel means 58 through the ring member 14 between the first surface 16 and the second axial face 26. The second channel means 58 carries the second fluid 54. The second channel means 58 at the second axial face 26 is positioned in close proximity to the second portion 28 of the second axial face 26. The double-flow type gland seal 10 thus far described as shown in FIG. 3 is typical of the prior art.

Figure 4:
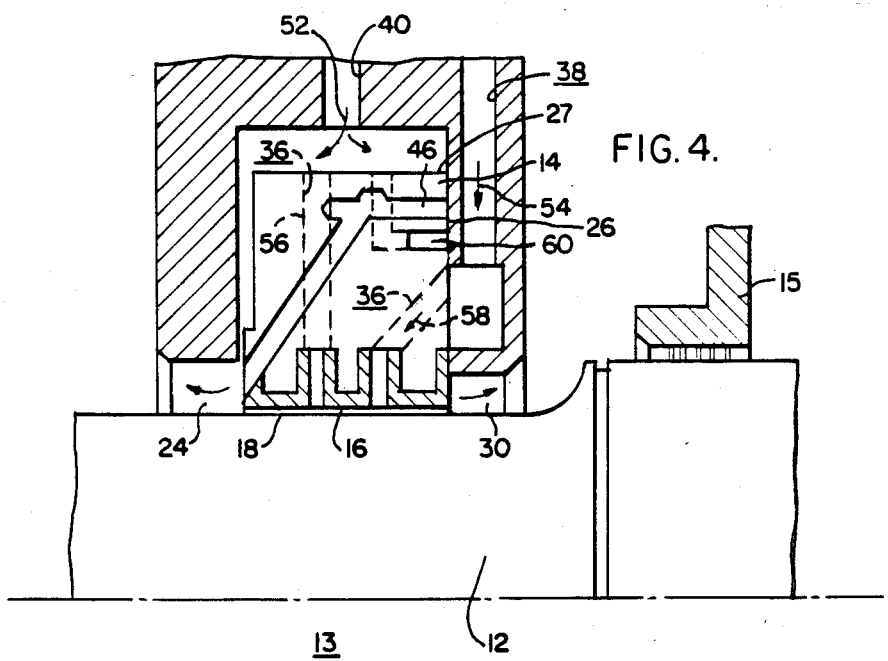
FIG. 4 is a cross-section of a single ring gland seal double-flow type of the present invention.

Referring to FIG. 4, where like numerals correspond to like elements of the previous figures, a double-flow type single ring gland seal 10 of the present invention further comprises a third channel means 60 through the ring member 14 for carrying the first fluid 52 between the outer radial face 27 and the second axial face 26.

The third channel means 60 at the outer face 27 is positioned intermediate the second channel means 58 and the passage means 46, whereby the second fluid 54 is prevented from leaking to the passage means. It has been found desirable to include the third channel means in a double-flow type seal 10 when using the passage means 46 of the present invention which as stated previously lowers the pressure on the second axial face 26. Without the provision of the third channel 60 some flow of the second fluid, i.e., oil with entrained hydrogen may result through the passage means 46. It has been found that by maintaining the pressure of the first fluid in the third channel 60 equal to the pressure of the second fluid in the second channel 58, the flow of hydrogen containing oil to the air side of the seal 10 is eliminated.

Figure 5:
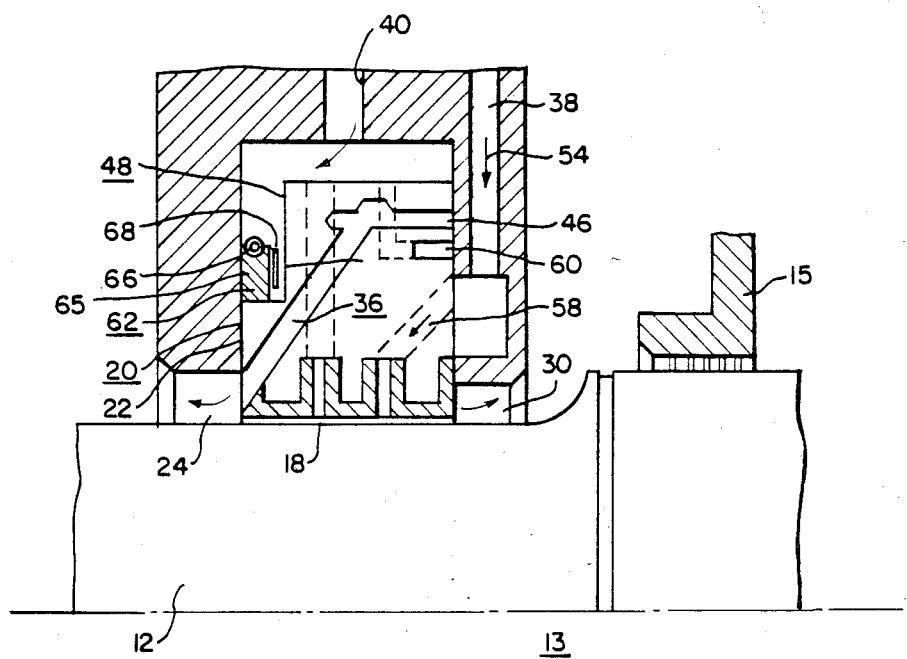
FIG. 5 is a cross-section of a single ring gland seal of the present invention including a face seal means.

Referring to FIG. 5 where like numerals correspond to like elements of the previous figures, it has been found desirable that the seal 10 further comprises face seal means 62 positioned proximate one end 64 of the relief portion 48 of the first face 20 proximate the first portion 22 for contacting the annular groove 34 whereby leakage of the barrier fluid 38 to the low pressure gaseous zone 24 is reduced. Preferably, the face seal means 62 comprises a segmented face seal ring. A segmented face seal ring as known in the art is shown in FIG. 5. A garter spring member 66 encompasses the segmented face seal for maintaining it in position. The face seal means 62 also desirably includes a split wave washer means 68 disposed between said relief portion 48 and said segmented face seal 65. The split wave washer provides rigidity to the segmented face seal ring 65 for the initial axial force that may be exerted on the segmented ring 65 during initial starting.

We claim:

1. A single ring gland seal for a rotating shaft member, said seal comprising:
    (a) a ring member having a first inner cylindrical surface, said inner surface of said ring member encompassing said shaft member by a predetermined clearance, said ring member having a first axial face with a first portion thereof nearest said shaft member contacting a low pressure gaseous zone, said ring member having a second axial face with a second portion thereof nearest said shaft member contacting a high pressure gaseous zone, said ring member having an outer radial face disposed between said first and second axial faces;
    (b) bracket means having an annular groove therein being shaped to receive said ring member, said ring member axially moveable along said shaft member within said annular groove;
    (c) channel means through said ring member for conducting a barrier fluid between said shaft and said annular groove;
    (d) barrier fluid input means for supplying barrier fluid to said channel means at a predetermined pressure which is greater than the pressure of said high pressure gaseous zone;
    (e) said ring member having a passage means therethrough for conducting a relatively low pressure gas between said first axial face and said second axial face;
    (f) said first axial face having a relief portion, whereby said pressurized barrier fluid exerts a force against said relief portion of said second axial face which is greater than the force exerted against said second axial face of said ring member whereby said second axial face is maintained against said annular groove face thereby diminishing the flow of said barrier fluid to said high pressure gaseous zone.

2. The single ring gland seal of claim 1, wherein said barrier fluid comprises a first fluid in fluid communication with said low pressure gaseous zone.

3. The single ring gland seal of claim 2, wherein said first fluid is oil containing entrained air.

4. The single ring gland seal of claim 1, wherein said low pressure gas of said low pressure gaseous zone is air.

5. The single ring gland seal of claim 1, wherein said high pressure gaseous zone comprises hydrogen gas.

6. The single ring gland seal of claim 3, said channel means comprises a first channel means through said ring member between said first inner surface and said outer radial face for carrying said first fluid, and a second channel means through said ring member between said inner surface and said second axial face for carrying a second fluid, said second channel means at said second axial face positioned in close proximity to said second portion of said second axial face.

7. The single ring gland seal of claim 6, wherein said second fluid comprises oil containing entrained hydrogen.

8. The single ring gland seal of claim 6, further comprising a third channel means through said ring member for carrying said first fluid between said outer radial face and said second axial face, said third channel means at said outer face positioned intermediate said second channel means and said passage means, whereby said second fluid is prevented from leaking to said passage means.

9. The single ring gland seal of claim 1, further comprising face seal means positioned proximate one end of said relief portion of said first face proximate said first portion for contacting said annular groove whereby leakage of said barrier fluid to said low pressure gaseous zone is reduced.

10. The single ring gland seal of claim 9, wherein said face seal means comprises a segmented face seal ring.

11. The single ring gland seal of claim 10, wherein said face seal means further comprises garter spring means encompassing said segmented face seal ring for maintaining said segmented face seal in position.

12. The single ring gland seal of claim 11, wherein said face seal means further comprises a split wave washer means disposed between said relief portion and said segmented face seal ring.

13. A dynamoelectric machine comprising:
a stator structure;
a rotating shaft member;
a ring member having a first inner cylindrical surface, said inner surface of said ring member encompassing said shaft member by a predetermined clearance, said ring member having a first axial face with a first portion thereof nearest said shaft member contacting a low pressure gaseous zone, said ring member having a second axial face with a second portion thereof nearest said shaft member contacting a high pressure gaseous zone, said ring member having an outer radial face disposed between said first and second axial faces;
bracket means having an annular groove therein being shaped to receive said ring member, said ring member axially moveable along said shaft member within said annular groove;
channel means through said ring member for conducting a barrier fluid between said shaft and said annular groove;
barrier fluid input means for supplying barrier fluid to said channel means at a predetermined pressure which is greater than the pressure of said high pressure gaseous zone;
said ring member having a passage means therethrough for conducting a relatively low pressure gas between said first axial face and said second axial face;
said first axial face having a relief portion, whereby said pressurized barrier fluid exerts a force against said relief portion of said first axial face which is greater than the force exerted against said second axial face of said ring member whereby said second axial face is maintained against said annular groove face thereby diminishing the flow of said barrier fluid to said high pressure gaseous zone.

14. The dynamoelectric machine of claim 13, wherein said barrier fluid comprises a first fluid in fluid communication with said low pressure gaseous zone.

15. The dynamoelectric machine of claim 14, wherein said first fluid is oil containing entrained air.

16. The dynamoelectric machine of claim 13, wherein said low pressure gas of said low pressure gaseous zone is air.

17. The dynamoelectric machine of claim 13, wherein said high pressure gaseous zone comprises hydrogen gas.

18. The dynamoelectric machine of claim 15, said channel means comprises a first channel means through said ring member between said first inner surface and said outer radial face for carrying said first fluid, and a second channel means through said ring member between said inner surface and said second axial face for carrying a second fluid, said second channel means at said second axial face positioned in close proximity to said second portion of said second axial face.

19. The dynamoelectric machine of claim 18, wherein said second fluid comprises oil containing entrained hydrogen.

20. The dynamoelectric machine of claim 19, further comprising a third channel means through said ring member for carrying said first fluid between said outer radial face and said second axial face, said third channel means at said outer face positioned intermediate said second channel means and said passage means, whereby said second fluid is prevented from leaking to said passage means.

21. The dynamoelectric machine of claim 13, further comprising face seal means positioned proximate one end of said relief portion of said first face proximate said first portion for contacting said annular groove whereby leakage of said barrier fluid to said low pressure gaseous zone is reduced.

22. The dynamoelectric machine of claim 21, wherein said face seal means comprises a segmented face seal ring.

23. The dynamoelectric machine of claim 22, wherein said face seal means further comprises garter spring means encompassing said segmented face seal ring for maintaining said segmented face seal in position.

24. The dynamoelectric machine of claim 23, wherein said face seal means further comprises a split wave washer means disposed between said relief portion and said segmented face seal ring.

* * * * *

UNITED STATES PATENT AND TRADEMARK OFFICE
CERTIFICATE OF CORRECTION

PATENT NO. : 4,579,349

DATED : April 1, 1986

INVENTOR(S) : Charles W. Pipich et al.

It is certified that error appears in the above-identified patent and that said Letters Patent is hereby corrected as shown below:

Claim 1, line 31, column 6, line 66, delete "second" and substitute -- first --.

Signed and Sealed this

Sixteenth Day of August, 1988

Attest:

DONALD J. QUIGG

Attesting Officer

Commissioner of Patents and Trademarks